United States Patent
Radulovic et al.

(12)
(10) Patent No.: US 6,477,485 B1
(45) Date of Patent: Nov. 5, 2002

(54) MONITORING SYSTEM BEHAVIOR USING EMPIRICAL DISTRIBUTIONS AND CUMULATIVE DISTRIBUTION NORMS

(75) Inventors: Dragan Radulovic, Lawrenceville, NJ (US); Robert E. LaBarre, Willington, CT (US)

(73) Assignee: Otis Elevator Company, Farmington, CT (US)

( * ) Notice: Subject to any disclaimer, the term of this patent is extended or adjusted under 35 U.S.C. 154(b) by 85 days.

(21) Appl. No.: 09/698,384

(22) Filed: Oct. 27, 2000

(51) Int. Cl.[7] .................................................. G06F 3/00
(52) U.S. Cl. ...................... 702/187; 702/186; 702/183; 702/196; 702/199
(58) Field of Search ................................. 702/183, 186, 702/187, 196, 199; 710/15; 712/227

(56) References Cited

U.S. PATENT DOCUMENTS 5,761,090 A * 6/1998 Gross et al. ............ 364/551.01
6,202,038 B1 * 3/2001 Wegerrich et al. .......... 702/183

\* cited by examiner

*Primary Examiner*—Marc S. Hoff
*Assistant Examiner*—Felix E. Suarez

(57) ABSTRACT

Sensors (12) attached to various parameters of a system (11), such as an elevator system or a chiller, provide values (14) of corresponding parameters which are utilized to build (15) an empirical distribution of the process, such as by means of bootstrapping methodology using a five-dimensional Markov chain model. In normal operation thereafter, the sensors are read periodically and in response to events, and an abnormality is determined by comparison of current information against the empirical distribution of the process. Deviations from normal behavior provide quantitative measure of system malfunction or abnormality; eliminating data from one or more sensors in each iteration of processing identifies one or more sensors associated with the abnormality. By utilizing cumulative distribution norm of deviation from normal behavior, the relative health of one system can be compared with the relative health of other, similar or dissimilar systems.

6 Claims, 4 Drawing Sheets

US 6,477,485 B1

MONITORING SYSTEM BEHAVIOR USING EMPIRICAL DISTRIBUTIONS AND CUMULATIVE DISTRIBUTION NORMS

TECHNICAL FIELD

This invention relates to monitoring machines or systems, such as elevators or chillers, using multiple sensor data, treated as a random sequence, to construct a stochastic process model of the machine or system, comprising an empirical distribution of the sequence of discrete data; comparison of empirical distribution of data acquired daily on-line with the base information of the stochastic process model provides quantitative and qualitative indicators of system health; use of a cumulative distribution norm, for each machine or system, allows relative comparison to other machines or systems.

BACKGROUND ART

Conventional methods for detecting abnormal machine or system behavior typically use models to reconstruct the behavior from sensor data. Then a combination of schemes, based on knowledge of experts along with elementary statistical methods, are used to focus on what are deemed to be relevant features, looking for known troublesome patterns in the data. Such methodology suffers from an abundance of human influence: the relevant features are selected in accordance with not only what an expert knows about the system, but also what an expert believes about system behavior. Such approaches are typically troubled by too much data, by extracting only signals deemed to be relevant, and treating the remaining numerous records as noise.

DISCLOSURE OF INVENTION

Objects of the invention include determining abnormality in system behavior without the use of domain knowledge (knowledge and beliefs of experts about the machine or system domain); detecting abnormal system behavior well before there is any human-perceptible change; providing quantitative measure of severity as a function of deviation from normalcy; providing qualitative classification of abnormality, indicative of a problem to be fixed; monitoring system behavior without use of expert domain knowledge until after abnormality has been detected; monitoring behavior of systems in a manner that allows comparing relative system health of one system to that of a different system; and system health monitoring methodology that can be applied universally to different systems, without tailoring.

This invention is predicated on the concept that treating time sequences of system sensor data as a stochastic process model of the system allows a separate stochastic process model to be built for each different system requiring no specific domain knowledge as a form of self-learning step. The invention is further predicated on use of the cumulative distribution norm to allow comparison of relative system health between one system and another similar, or even dissimilar system. This invention is further predicated on the discovery that, although a vector represented by tens of bits has several million possible rearrangements, as little as on the order of 100 different states may be of value in monitoring a system.

According to the present invention, a data stream, such as periodic samplings of a plurality of sensors, representing the values of relevant parameters of the system, are first utilized to build an empirical distribution of the process, which represents a stochastic process model of the system. In one embodiment, bootstrapping methodology is used to build an empirical distribution, using a five-dimensional Markov chain model. Thereafter, the stream of system data is monitored, such as reading the sensors each five milliseconds or whenever any event in a system occurs, e.g., car call, floor switch, compressor turn-on, and abnormality is determined by comparison of the current (e.g., daily) information against the empirical distribution of the process. According to the invention, confidence intervals (deviations) from normal behavior are identified to provide a quantitative measure of system malfunction or other abnormality (if any). According further to the invention, selective processing of the data stream (by eliminating data from one or more sensors in each iteration of processing) qualitatively identifies abnormal behavior, by indicating one or more sensors with which the abnormality is associated.

In accordance with the invention still further, the cumulative distribution norm of deviation from normal behavior is utilized to permit comparing the relative health of one system with the relative health of another system, whether the systems be alike, similar or dissimilar, such as to determine which system should receive service first.

The present invention is totally data driven, and does not require use of human intervention until the source of a system abnormality is identified. The invention permits qualitative and quantitative identification of abnormalities in a given system, and permits comparing relative system health between different, even dissimilar systems.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
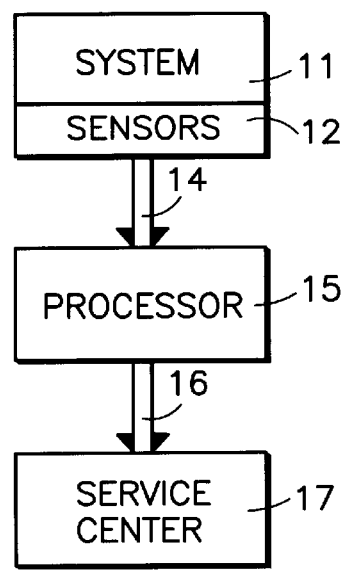
FIG. 1 is a high level functional block illustration of the invention.

As an example only, in FIG. 1, a system 11 is fitted with a number of sensors 12, which in this embodiment is taken to be twenty-one sensors. The data from each of the sensors 12, provides suitably processed signals over a trunk of lines 14 to a mathematical processor 15, the output of which is applied on a trunk of lines 16 to a service center 17 to indicate notable prognostic or diagnostic information.

In addition to the stream of sensor data, a time stamp is associated with each group of sensor data. The discrete sensor data comprises a sequence of random vectors, $\overline{X}_i$ (which for composition simplicity is hereinafter referred to simply as $X_i$). Each vector indexed by a record number, one, two, three. . . , each having as values a 21-bit sensor status and a time stamp. The time stamp may typically be kept as minutes to the millisecond, or in any other conventional way.

As an initial consideration in determining how to monitor any particular sort of a system (such as an elevator or a chiller), it is first useful to determine which of all the possible states actually occur in such a system. As an example, according to the invention, only about 120 different states occur in an elevator, and only 100 states provide 99.99% of all of the data. Thus, the data can be converted into a stochastic process where each of the 100 most frequent states are identified by an integer which is simply a decimal representation of the 21-bit binary vector, and each of those integer representations are identified as a particular state, $S_k$, for some value k≦100. Thus instead of a sequence of vectors $X_1, X_2, X_3 \ldots$, there becomes a sequence of states $S_5, S_{92}, S_{27} \ldots$ In any real system, one record is not totally independent of the next preceding record. In fact, any record will provide significant information about what the next significant record would be. That is, the probability distribution of $X_{i+1}$ depends on the value $X_i$. The dependency is weak because it is clear that the dependency between $X_i$ and $X_{i+k}$ diminishes as k approaches infinity (k→∞), and the knowledge of one record is very little help in predicting a record which precedes it by a large number, such as 100.

According to the invention, the data stream is well represented by a stationary, weakly dependent, five-dimensional Markov chain. The stationarity is present because the probability distributions of $X_m$ and $X_n$ are equal for any predetermined m and n, so long as m and n do not depend on the outcomes of $X_i$. That is, although the $100^{th}$ record and the $200^{th}$ record are probably different, the $100^{th}$ record has the same chance of being a particular 21-bit vector as does the $200^{th}$ record.

Figure 2:
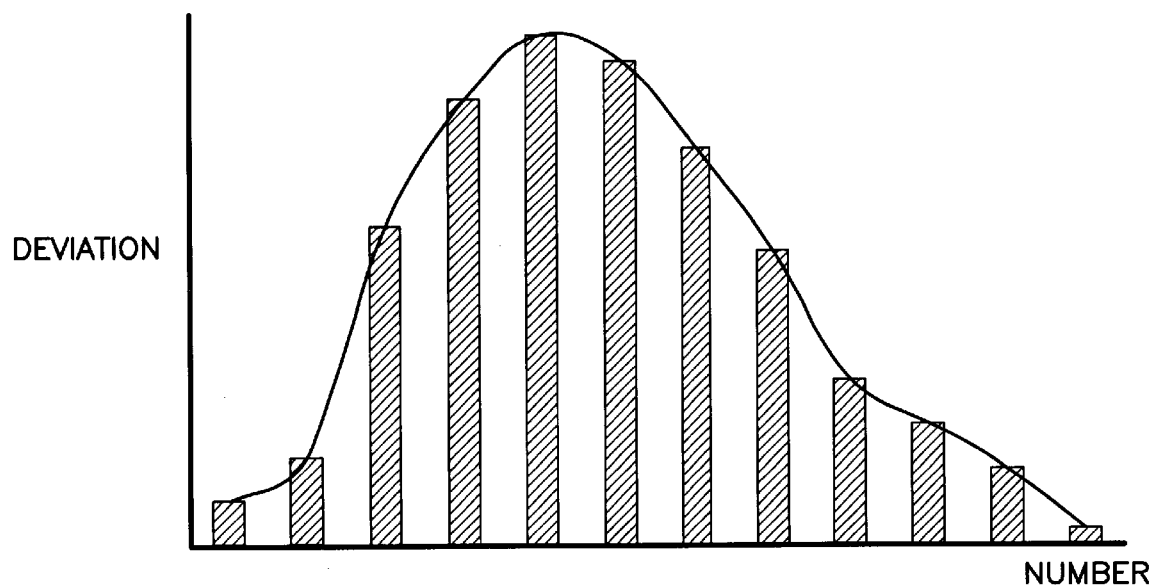
FIG. 2 is a plot of an empirical distribution of system data.

According to the invention, each record does not depend on all of the previous records, but only on a finite number, in this example taken to be 5. Thus, the probability is quite high that any record, $P(X_i=V)$, depends only the outcome of a few (in this example four) previous records, thereby being capably modeled by a five-dimensional Markov chain having finite states (in this example, 100 states), is quite high. The time stamp is included as a sixth component of each vector, where the time, $T_i$, is the time for transition from $X_{i-1}$ to $X_i$. Since the model is a five-dimensional Markov chain, it may be assumed that all the information related to this process is presented in a five-dimensional marginal distribution, or equivalently, in a five-dimensional probability transition matrix. This may be represented as $$P_{i,j,k,l,m}=P(X_n=S_m|X_{n-1}=S_l, X_{n-2}=S_k, X_{n-3}=S_j, X_{n-4}=S_i),$$

where i, j, k, l, and m, etc., range between 1 and 100. A bootstrap for Markov chains is utilized to build an empirical distribution of the daily deviations. This process begins, in an initialization phase of empirically determining normal system operation, by making a count matrix of the 100 possible states to determine the number of times that the input states transition from any particular state, $S_i$, to any particular other state, $S_j$. This is done for actual system data achieved over, for instance, ten or more weeks of time. The resulting matrix is easily converted into a probability transition matrix simply as the ratio of each datum vs. the summation of each row of data. Using this as a model, pseudorandom numbers, beginning with an arbitrary number, are applied to the empirical probability transition matrix, with perhaps as much as 10,000 random numbers (or whatever a typical day's worth of data amounts to) being applied in one sequence. As before, this will provide a counts matrix which can then be converted into a probability transition matrix. By using a sequence of on the order of 10,000 numbers, one comes up with a matrix based upon on the order of a day's worth of data. The sequence of pseudorandom numbers is applied to the empirical probability transition matrix some number, say, 1000, of times, each resulting in a probability transition matrix from about a day's worth of random data. Each probability transition matrix, simulating about a day's worth of data, is then compared with the empirical probability transition matrix using any of the standard distances, such as the Kolmogorov distance, distance based on the Frobenius norm, $L_2$ distance, etc., described in Parzen, E., (1962) *Stochastic Processes,* Holden-Day. This then provides a series of numbers, scalar values, $N(P^1), N(P^2) \ldots, N(P^{1000})$ which are then plotted in a histogram of the scalar values representing the probability transition matrices for each day, vs. days. Then, a smooth curve of the histogram equals the empirical distribution of the typical daily variation of the system. The empirical distribution for the system is, for example, illustrated in FIG. 2. This is a completion of the initialization phase of the invention.

Figure 3:
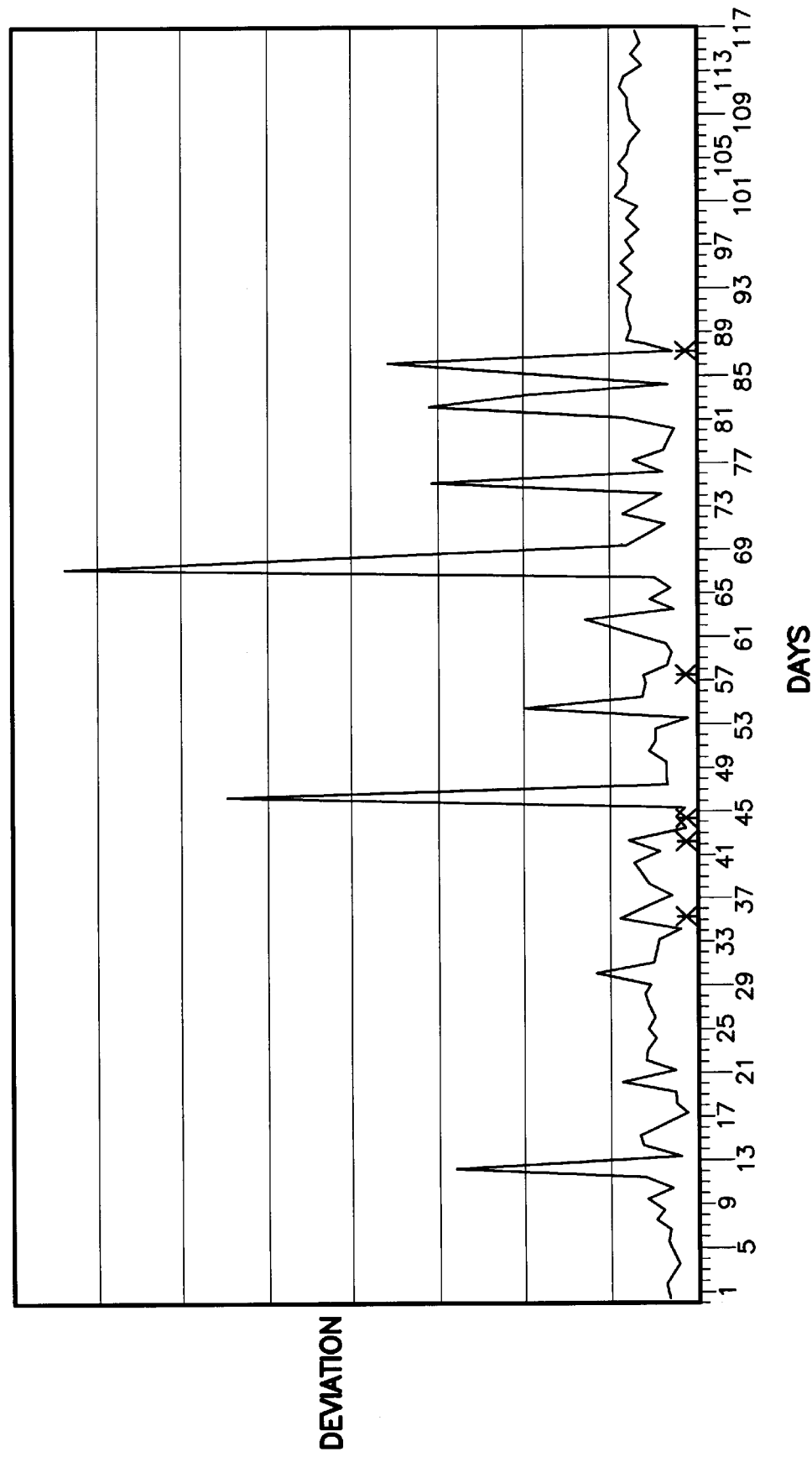
FIG. 3 is a plot of statistical deviation from average as a function of real time (days).

In ordinary operation of the system, while monitoring the system to determine an indication of its condition, each vector, comprising numerical values of sensed conditions for 21 (or so) different sensors is converted to an integer, Sk, and the approximately 10,000 integers that are accumulated during a given current, period of interest, such as a day are applied to the bootstrap process of first generating a transition count matrix and then converting it into a probability transition matrix, as described hereinbefore. The day's matrix is subtracted from the base matrix, yielding a deviation matrix. Then, the norm is applied to the deviation matrix for that day to get a scalar value of deviation which may then be plotted day-by-day, as is illustrated in FIG. 3. The scalar deviation is judged by comparison with the empirical distribution of FIG. 2: if it falls within values of high likelihood, it is deemed normal; if it falls within values of low likelihood, it is deemed abnormal. Thus a discrete output can be obtained for each operational day.

If $P=[p_i, p_j, p_k, p_l, p_m]$ is an unknown five-dimensional probability transition matrix, then $\|P_v^n-P\|\approx C/n^{1/2}$, where $\|\ldots\|$ is any norm on (that is, a method of measuring) the matrix space, and $P_v^n$ is the empirical estimate of P based on the n data points sampled on the vth day. The constant C depends on the norm, $\|\ldots\|$, and on the probability transition matrix, P, but it does not depend on n. Because C depends on the norm and P, relative health monitoring between different systems cannot be accomplished, since different systems will have a different probability transition matrix P.

Figure 5:
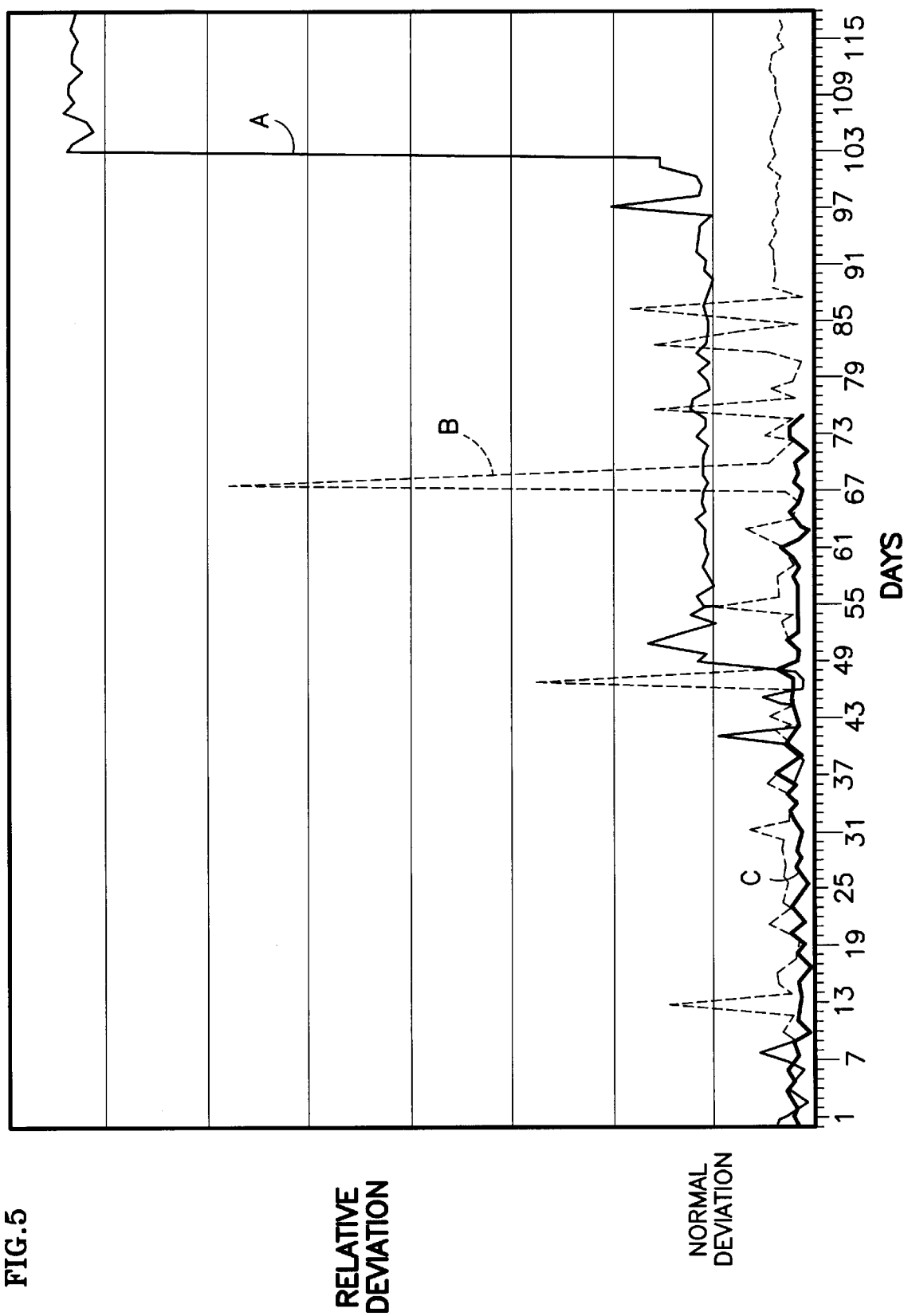
FIG. 5 is a group of superimposed plots of the relative deviation from normality, using the cumulative distribution norm of the difference between the base probability transition matrix and the current (daily) probability transition matrix, for three different systems.

According to the present invention, use of the cumulative distribution norm, such as the known CDF norm, eliminates the dependence of C on the probability transition matrix P. Since the constant C does not depend on the probability transition matrix P, the cumulative distribution norm of different systems can be compared with one another. That is to say, the measure of relative health of each one system being normalized to that one system, it can then be compared with the relative system health for another system which has been normalized with respect to that other system. This is an important aspect of the present invention. To achieve this advantage, the CDF norm is applied to the deviation matrix, hereinbefore. FIG. 5 shows the relative deviation from normalcy of three different elevators over the same calendar time. It can thus be seen that the elevator designated A is in the worst shape, that designated B is in the next worst shape, and that designated C is in pretty good shape. Thus, service personnel may orient their efforts to favor servicing elevator A over elevator B, and ignoring elevator C at the present time.

Figure 4:
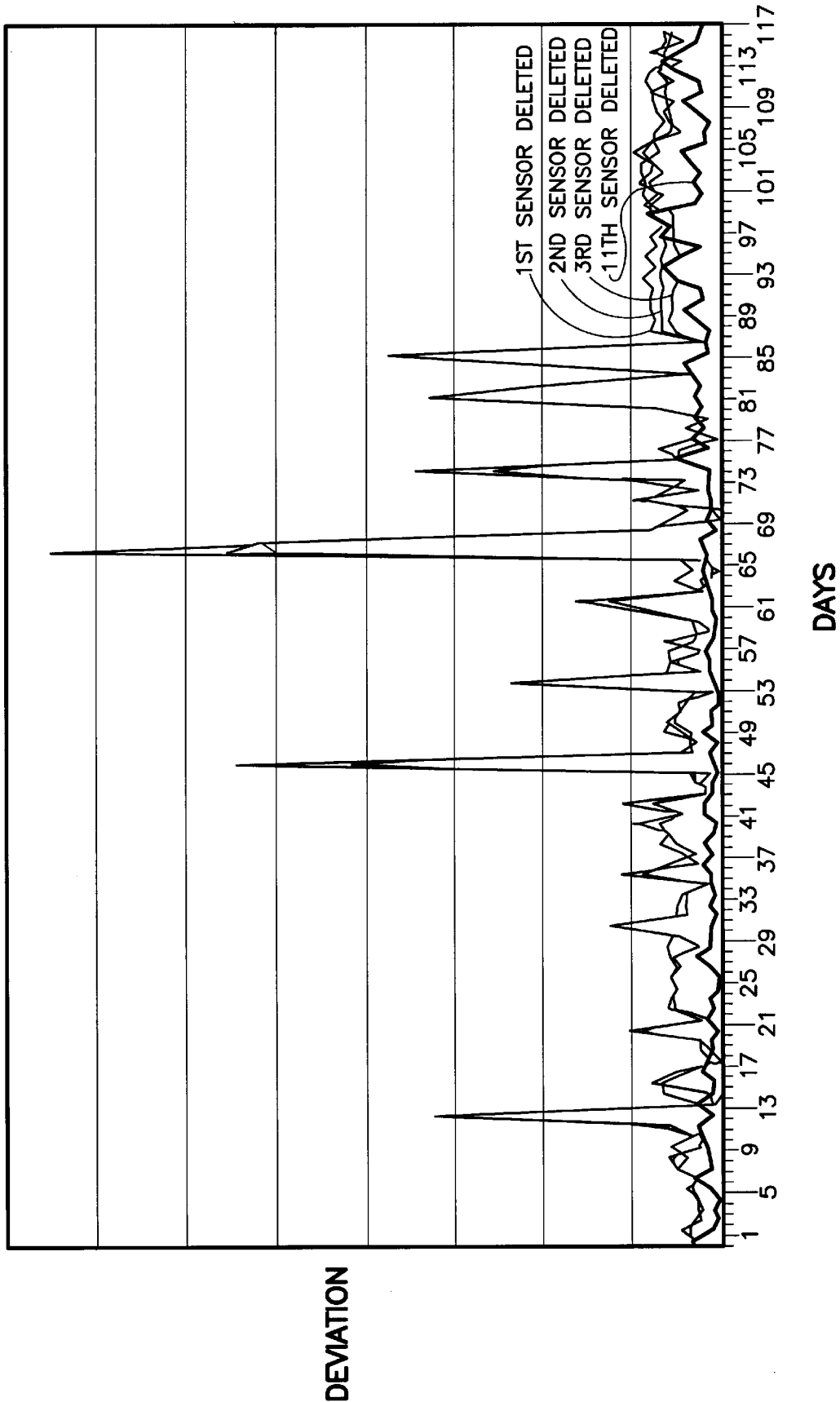
FIG. 4 is a group of superimposed plots of statistical deviation from the base information (as in FIG. 3), each determined with the data from a different sensor eliminated from the base processing and from the current (daily) processing.

Another aspect of the present invention is illustrated in FIG. 4. Therein, there are a number of superimposed traces, the three thin traces representing deviations from normalcy plotted as a function of days, the deviations being determined by performing the process without including the data from either a first sensor, or a second sensor, or a third sensor, respectively. The heavier plot is the deviation as a function of days resulting from performing the foregoing process of the invention with the data of a fourth sensor deleted. It is clear from the plot, that the significant deviations (all those at around five percent or more) were caused by the fourth sensor, since its deletion produces normal results.

To achieve this aspect of the present invention, the entire process must be performed once for each sensor or group of sensors which are to be ignored, first taking the data of 100 days or so, but nullifying in turn each sensor which it is desired to eliminate from the process. Thus, there need to be as many base matrices as there are sensors (or groups of sensors) which it is desired to eliminate. It should be understood that when base matrices reflecting the lack of one or more sensors are being made, the individual states, $S_i$, will have different integers representing them with the data of one or more sensors being eliminated from them. Stated alternatively, the same 100 days or so worth of data will simply have the values derived from one or more sensors eliminated therefrom thereby achieving different integer values for the states, $S_i$, but the remaining process is the same. To achieve the results of FIG. 4, a base matrix having the first sensor eliminated will have subtracted therefrom a matrix for each day with the first sensor eliminated. The same is true for other sensors for which the data is eliminated. Other than nullifying the data of one or more sensors, the process is the same as described hereinbefore to achieve an empirical distribution (without that one or more sensors) and a scalar value of deviation for each successive day (without that same one or more sensors).

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of monitoring health of an operating system, comprising:

in an initial phase of empirically determining a representation of normal operation of said system
   (a) connecting a plurality of sensors to said system, each sensor providing a signal manifestation of a condition or state of said system;
   (b) recording as a group, said signal manifestations of all of said sensors repetitively, in a time sequence, along with a signal manifestation of the time of recording such group;
   (c) performing said step (b) over many weeks of time;
   (d) in response to said data manifestations provided by said step (c), providing a base probability transition matrix of the data represented thereby as an indication of normal system behavior;
then, to determine health of said system on a current basis during normal operation of said system
   (e) performing said step (b) over a period of time of interest;
   (f) in response to said data manifestations resulting from performance of said step (e), providing a current probability transition matrix of the data represented thereby;
   (g) performing matrical subtraction of said current probability transition matrix from said base probability transition matrix to provide a deviation matrix;
   (h) taking a first cumulative distribution norm of said deviation matrix in order to provide a scalar value of the deviation of said current condition from said base condition of normal system behavior; and
   (i) taking a second cumulative distribution norm of said deviation matrix in order to provide a scalar value of the relative deviation of said current condition from said base condition of normal system behavior.

2. A method of monitoring health of an operating system, comprising:

in an initial phase of empirically determining a representation of normal operation of said system
   (a) connecting a plurality of sensors to said system, each sensor providing a signal manifestation of a condition or state of said system;
   (b) recording as a group, said signal manifestations of all of said sensors repetitively, in a time sequence, along with a signal manifestation of the time of recording such group;
   (c) performing said step (b) over many weeks of time;
   (d) in response to said data manifestations provided by said step (c), providing a base probability transition matrix of the data represented thereby as an indication of normal system behavior;
then, to determine health of said system on a current basis during normal operation of said system
   (e) performing said step (b) over a period of time of interest;
   (f) in response to said data manifestations resulting from performance of said step (e), providing a current probability transition matrix of the data represented thereby;
   (g) performing matrical subtraction of said current probability transition matrix from said base probability transition matrix to provide a deviation matrix; and
   (h) taking a cumulative norm of said deviation matrix in order to provide a scalar value of the relative deviation of said current condition from said base condition of normal system behavior.

3. A method of comparing the health of one system to the health of at least one other system, comprising:

performing the method of claim 2 on each system to be compared; and comparing the scalar value of the relative deviation of said current condition provided in said step (h) for each of said systems to the relative deviation of said current condition provided in said step (h) for each other one of said systems.

4. A method of monitoring health of an operating system, comprising:

in an initial phase of empirically determining a representation of normal operation of said system
   (a) connecting a plurality of sensors to said system, each sensor providing a signal manifestation of a condition or state of said system;

(b) recording as a group, said signal manifestations of all of said sensors repetitively, in a time sequence, along with a signal manifestation of the time of recording such group;

(c) performing said step (b) over many weeks of time;

(d) in response to said data manifestations provided by said step (c), providing a base probability transition matrix of the data represented thereby as an indication of normal system behavior;

then, to determine health of said system on a current basis during normal operation of said system (e) performing said step (b) over a period of time of interest;

(f) in response to said data manifestations resulting from performance of said step (e), providing a current probability transition matrix of the data represented thereby;

(g) performing matrical subtraction of said current probability transition matrix from said base probability transition matrix to provide a deviation matrix; and (h) taking a cumulative distribution norm of said deviation matrix in order to provide a scalar value of the deviation of said current condition from said base condition of normalcy.

5. A method according to claim 4 further comprising:

(i) applying a sequence of pseudorandom numbers having an arbitrary beginning to said base probability transition matrix to provide a like sequence of random probability transition matrices;

(j) taking a cumulative distribution norm of each of said transition matrices to provide a like sequence of random scalar values;

(k) providing a histogram of said random scalar values, said histogram representing the empirical distribution of the operation of said system; and (l) comparing the scalar value of the deviation of said current condition, provided in said step (h), to said empirical distribution, to provide a quantitative measure of the deviation from normalcy of current operation of said system.

6. A method according to claim 4 or claim 5 wherein said steps (c) and (e) are performed with the signal manifestations of one or more of said sensors eliminated from said group of signal manifestations utilized in said steps (d) and (f), thereby to indicate the contribution of the condition or state of each of said one or more sensors to the current condition of said system.

* * * * *